(12) United States Patent
Chen et al.

(10) Patent No.: US 11,823,370 B2
(45) Date of Patent: Nov. 21, 2023

(54) METHOD AND APPARATUS FOR INSPECTING BATTERY TAB AND STORAGE MEDIUM

(71) Applicant: CONTEMPORARY AMPEREX TECHNOLOGY CO., LIMITED, Ningde (CN)

(72) Inventors: Can Chen, Ningde (CN); Qiangwei Huang, Ningde (CN); Zhiyu Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/126,906

(22) Filed: Mar. 27, 2023

(65) Prior Publication Data
US 2023/0289948 A1    Sep. 14, 2023

Related U.S. Application Data

(63) Continuation of application No. PCT/CN2021/126675, filed on Oct. 27, 2021.

(51) Int. Cl.
*G06T 7/00* (2017.01)
*G06T 7/70* (2017.01)
(Continued)

(52) U.S. Cl.
CPC .............. *G06T 7/0004* (2013.01); *G06T 7/11* (2017.01); *G06T 7/12* (2017.01); *G06T 7/136* (2017.01); *G06T 7/187* (2017.01); *G06T 7/70* (2017.01)

(58) Field of Classification Search
CPC . G06T 7/0004; G06T 7/11; G06T 7/12; G06T 7/136; G06T 7/187; G06T 7/70
See application file for complete search history.

(56) References Cited

U.S. PATENT DOCUMENTS

2023/0064943 A1*  3/2023  Hu ..................... H04N 23/56
2023/0068956 A1*  3/2023  Matsui ................ H01M 50/536
(Continued)

FOREIGN PATENT DOCUMENTS

CN      108375544 A      8/2018
CN      112525917 A      3/2021
(Continued)

OTHER PUBLICATIONS

Contemporary Amperex Technology Co., Limited, PCT/CN2021/126675, International Search Report and Written Opinion, dated Jul. 8, 2022, 14 pgs.

*Primary Examiner* — Bobbak Safaipour
(74) *Attorney, Agent, or Firm* — XSENSUS LLP

(57) ABSTRACT

The present application discloses a method for inspecting a battery tab, the method including: obtaining a sectional view of a plurality of layers of tabs of a battery; identifying and analyzing the sectional view to obtain a plurality of connected domains, where each connected domain includes one tab or a plurality of tabs that are bonded with each other; determining, based on positions and a number of intersection points of tab bonding in each connected domain, a number of layers of tabs corresponding to the connected domain; calculating a total number of layers of the plurality of layers of tabs in the sectional view based on the number of layers of tabs corresponding to the connected domain; and determining, based on the total number of layers of tabs and a preset real number of layers of tabs, whether the plurality of layers of tabs are folded.

10 Claims, 9 Drawing Sheets

(51) Int. Cl.
  *G06T 7/187* (2017.01)
  *G06T 7/12* (2017.01)
  *G06T 7/136* (2017.01)
  *G06T 7/11* (2017.01)

(56) References Cited

U.S. PATENT DOCUMENTS

2023/0181010 A1* 6/2023 Suzuki ............... A61B 1/00147
                                              53/443
2023/0231252 A1* 7/2023 Muelberger ......... H01M 50/211
                                              429/163
2023/0231282 A1* 7/2023 Kim .................... H01M 50/536
                                              429/177
2023/0231287 A1* 7/2023 Wang ................. H01M 50/536
                                              429/211

FOREIGN PATENT DOCUMENTS

| CN | 113156528 A | 7/2021 |
| CN | 113203745 A | 8/2021 |
| CN | 113376177 A | 9/2021 |

* cited by examiner

METHOD AND APPARATUS FOR INSPECTING BATTERY TAB AND STORAGE MEDIUM

CROSS-REFERENCE TO RELATED APPLICATION

This application is a continuation of PCT Patent Application No. PCT/CN2021/126675, entitled "METHOD AND APPARATUS FOR INSPECTING BATTERY TAB AND STORAGE MEDIUM" filed on Oct. 27, 2021, which is incorporated herein by reference in its entirety.

TECHNICAL FIELD

The present application relates to the technical field of battery assembly, and in particular, to a method and an apparatus for inspecting a battery tab and a storage medium.

BACKGROUND ART

With the gradual increase of electric vehicles, the application of traction batteries is also increasing. At present, manufacturing methods of traction battery jelly rolls mainly include winding and stacking, where winding is the most widely applied method. To facilitate production and manufacturing, an electrode plate of a core used for winding usually requires die-cutting processing and only a part of metal foil through which a current needs to pass through is reserved, where this part of metal foil is a tab. Because the metal foil used in the lithium battery electrode plate is extremely thin and has low strength, the tab is prone to be folded in a winding process and consequently is wound into a coating film region of the core. There are two types of folding: one type is folding the tab into the electrode plate of the tab; and the other type is folding the tab onto a separator. Existing folding of a tab is generally inspected through visual inspection and Hi-pot testing of applying a voltage to monitor the resistance of the core. However, manual visual inspection is inefficient and prone to missed inspection. The Hi-pot testing has a high inspection rate only for a tab that is folded onto a separator, but it is difficult for the Hi-pot testing to identify a tab that is folded into a layer of the tab. Folding the tab into the electrode plate of the tab leads to a low capacitance, a short circuit, and the like of the core, and even causes thermal runaway and fire.

SUMMARY OF THE INVENTION

In view of the above problems, the present application provides a method and an apparatus for inspecting a battery tab and a storage medium, which can automatically identify folding of a tab, and can not only improve the inspection efficiency, but also effectively reduce the missed inspection rate.

According to a first aspect, the present application provides a method for inspecting a battery tab, including: obtaining a sectional view of a plurality of layers of tabs of a battery to be inspected; identifying and analyzing the sectional view to obtain a plurality of connected domains, where each connected domain includes one tab or a plurality of tabs that are bonded with each other; determining, according to positions and a number of intersection points of tab bonding in each connected domain, a number of layers of tabs corresponding to each connected domain; calculating a total number of layers of the plurality of layers of tabs in the sectional view according to the number of layers of tabs corresponding to each connected domain; and determining, according to the total number of layers of tabs and a preset real number of layers of tabs, whether the plurality of layers of tabs are folded.

In the method for inspecting a battery tab in the technical solution of the embodiment of the present application, after the sectional view of the plurality of layers of tabs of the battery to be inspected is obtained, the sectional view is identified and analyzed to obtain the plurality of connected domains, where each connected domain includes one tab or a plurality of tabs that are bonded with each other, each connected domain is analyzed separately according to the positions and the number of the intersection points of tab bonding in the connected domain, to obtain the number of layers of tabs corresponding to the connected domain, so that the obtained number of layers of tabs in each connected domain is more accurate, and the total number of layers of tabs in the plurality of layers of tabs in the sectional view is determined according to the obtained number of layers of tabs corresponding to each connected domain. Compared with directly identifying the total number of layers of tabs in the sectional view, the technical solution provided by the present application first proposes a technical solution that performs inspection based on connected domains and determines the intersection points of tab bonding. The obtained sectional view of the plurality of layers of tabs is divided into the plurality of connected domains based on the possible intersection points of tab bonding, and then the tabs in each connected domain are calculated separately, and then calculated results are summed up, so that the result of the total number of layers of tabs of the obtained sectional view is more accurate. Therefore, in determining, according to the total number of layers of tabs and the preset real number of layers of tabs, whether the plurality of layers of tabs are folded, the determining accuracy is higher and the missed inspection rate can be effectively reduced. In addition, the method for inspecting a battery tab in the embodiment can automatically identify the folded tab by introducing connected domains and performing related image recognition, which not only improves the inspection efficiency, but also effectively reduces the missed inspection rate.

In some embodiments, the determining, according to positions and a number of intersection points of tab bonding in each connected domain, a number of layers of tabs corresponding to each connected domain includes: identifying the positions and the number of intersection points of tab bonding in each connected domain; if the number of intersection points in the connected domain is 0, determining that a number of layers of tabs in the connected domain is 1; if the number of intersection points in the connected domain is 1 or more, dividing the connected domain into a plurality of regions according to the positions of the intersection points, where each region does not include the intersection point, and the connected domain includes a plurality of tabs that are bonded with each other; and determining the number of layers of tabs of the connected domain according to a number of connected sub-regions in each of the plurality of regions, where each connected sub-region includes a non-bonded part or a fully bonded part of the plurality of tabs that are bonded with each other. In the embodiment, when there is an intersection point in the connected domain, it means that there are a plurality of tabs that are bonded with each other in the connected domain. In this case, it is necessary to divide the connected domain into the plurality of regions along a length extension direction of the tab according to the position of the intersection point. Because each region no longer includes the intersection point, this avoids that because a region of the obtained plurality of regions includes bonding of tabs, two bonded parts are considered as a connected sub-region, which helps to accurately determine the number of layers of tabs in each region.

In some embodiments, the dividing the connected domain into a plurality of regions according to the positions of the intersection points, where each region does not include the intersection point includes: taking a preset offset along the extension direction of the connected domain on two sides of the position of each intersection point as a region boundary; and dividing the connected domain into the plurality of regions according to the region boundary, where each region does not include the intersection point. In the embodiment, the preset offset along the extension direction of the connected domain on two sides of the position of each intersection point is taken as the region boundary. This avoids dividing a tab near the intersection point into the region, to avoid that a tab at the boundary is counted repeatedly because each divided region is excessively narrow, thereby further improving the inspection accuracy of the number of connected sub-regions in the region.

In some embodiments, the identifying and analyzing the sectional view to obtain a plurality of connected domains, where each connected domain includes one tab or a plurality of tabs that are bonded with each other includes: eliminating a tab bonding hole with an area smaller than a preset threshold in the sectional view, to obtain a first image; and performing connected domain analysis on the first image to obtain the plurality of connected domains, where each connected domain includes one tab or a plurality of tabs that are bonded with each other. In the embodiment, eliminating the tab bonding hole with an area smaller than the preset threshold in the sectional view can improve efficiency.

In some embodiments, the eliminating a tab bonding hole with an area smaller than a preset threshold in the sectional view, to obtain a first image includes: performing binarization processing on the sectional view to obtain a binarized image; and setting a pixel at a position of a connected domain with an area smaller than the preset threshold in the binarized image to white, to obtain the first image.

In some embodiments, the setting a pixel at a position of a connected domain with an area smaller than the preset threshold in the binarized image to white, to obtain the first image includes: interchanging a pixel value of a pixel with a pixel value of 0 with a pixel value of a pixel with a pixel value of 255 in the binarized image, to obtain an interchanged image; determining a position of a connected domain with a pixel value of 255 and an area smaller than the preset threshold in the interchanged image; and adjusting, to 255, a pixel value of a pixel in the binarized image that is corresponding to a position of a connected domain with an area smaller than the preset threshold in the interchanged image, to obtain the first image.

In some embodiments, the determining the number of layers of tabs of the connected domain according to a number of connected sub-regions in each of the plurality of regions includes: determining the number of connected sub-regions in each of the plurality of regions; and taking the greatest number of connected sub-regions in the plurality of regions in the connected domain as the number of layers of tabs of the connected domain. In the embodiment, the maximum number of connected sub-regions in the plurality of regions in the connected domain is taken as the number of layers of tabs in the connected domain, which helps to accurately calculate the number of layers of tabs in the region, thereby accurately inspecting whether the tab is folded.

In some embodiments, the determining the number of connected sub-regions in each of the plurality of regions includes: obtaining lengths of all connected sub-regions in each of the plurality of regions; and determining the number of connected sub-regions in each region according to a number of connected sub-regions that are in the region and whose lengths are greater than 1/N times of the longest connected sub-region in the region, where N is greater than 0. In the embodiment, there is proposed a method for determining the number of connected sub-regions in each region according to the number of connected sub-regions that are in the region and whose lengths are greater than 1/N times of the longest connected sub-region in the region, so as to avoid incorrectly determining the burr as a bonded tab, thereby eliminating the burr interference and further improving the inspection accuracy of the number of layers of tabs.

According to a second aspect, the present application provides an apparatus for inspecting a battery tab, including: at least one processor; and a memory communicatively coupled to the at least one processor; where the memory stores instructions executable by the at least one processor, and when executed by the at least one processor, the instructions cause the at least one processor to perform the method for inspecting a battery tab in the above embodiment.

According to a third aspect, the present application provides a computer-readable storage medium storing a computer program, where when the computer program is executed by the processor, the method for inspecting a battery tab in the above embodiment is performed.

The aforementioned description is only an overview of the technical solutions of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

Various other advantages and benefits will become apparent to those of ordinary skill in the art upon reading the following detailed description of preferred embodiments. The drawings are merely for the purpose of illustrating the preferred embodiments and are not to be construed as limiting the present application. Moreover, like components are denoted by like reference numerals throughout the drawings. In the drawings.

DETAILED DESCRIPTION OF EMBODIMENTS

Figure 1:
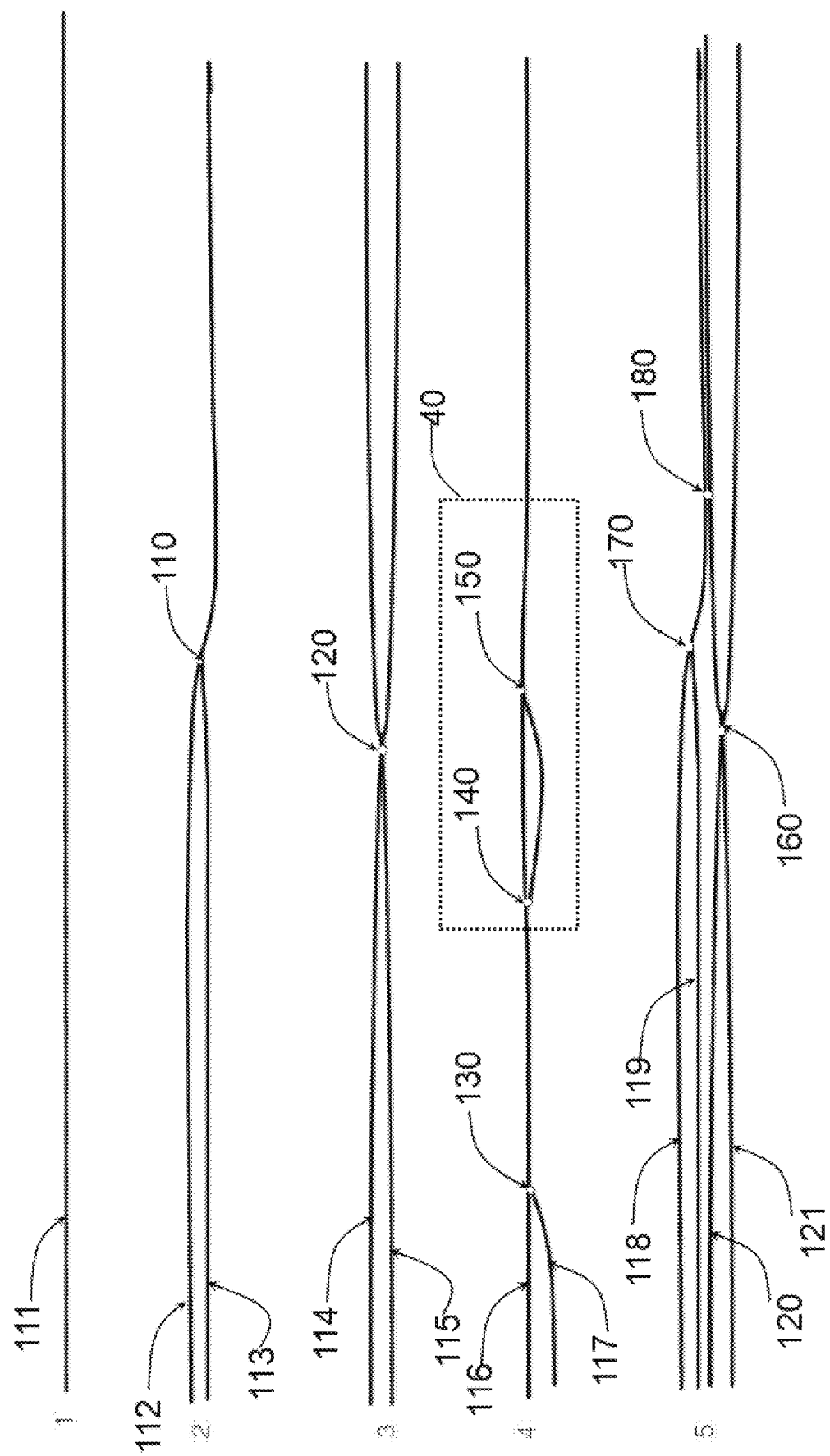
FIG. 1 is a schematic diagram of several bonding states of a tab found by the inventor.

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counterclockwise", "axial", "radial", "circumferential", etc. are based on the orientation or position relationship shown in the drawings and are merely intended to facilitate and simplify the description of the embodiments of the present application, rather than indicating or implying that the device or element considered must have a particular orientation or be constructed and operated in a particular orientation, and therefore not to be construed as limiting the embodiments of the present application.

In the description of the embodiments of the present application, unless otherwise explicitly specified and defined, the technical terms "mounting", "mutual connection", "connection", "fixing", etc. should be understood in a broad sense, for example, they may be a fixed connection, a detachable connection, or an integrated connection; may be a mechanical connection or an electrical connection; and may be a direct connection or an indirect connection through an intermediate medium, and may be communication between interiors of two elements or interaction between the two elements. For those of ordinary skill in the art, the specific meaning of the above terms in the embodiments of the present application can be understood according to specific situations.

Folding a battery tab into an electrode plate of the tab leads to a low capacitance, a short circuit, and the like of a cell, and even causes thermal runaway and fire. Therefore, in the production process, it is necessary to inspect whether the battery tab is folded. In the current inspection method, manual visual inspection is inefficient and prone to missed inspection. The Hi-pot testing only has a high inspection rate for a tab that is folded onto a separator, but is difficult to identify a tab that is folded into a layer of the tab. At present, there is no inspection method that can automatically identify folding of the tab, and can not only improve the inspection efficiency but also effectively reduce the missed inspection rate.

To alleviate the above problems, the applicant finds in studies that a number of layers of battery tabs of a battery with a fixed model is fixed, and when the battery tabs are folded, the number of layers of battery tabs increase. For example: When a tab is turned over, a number of layers of the tab changes from 1 layer to 2 layers. Therefore, by inspecting a number of layers of the battery tab and determining whether the number of layers of the battery tab is the same as a real number of layers of the tab, it can be determined whether the tab in the battery is folded.

Based on this, the applicant finds that by photographing a sectional view of a multi-layer tab of a battery to be inspected and analyzing pixel brightness and distribution of the sectional view, several line drawings corresponding to the plurality of layers of tabs of the battery to be inspected can be obtained, a plurality of sampling points may be randomly set, line information on each sampling point is obtained, and a maximum value is taken as a statistical result of the plurality of layers of tabs. However, the applicant finds in practice that: In the actual production process, due to bonding of tab foil, when a sampling point is at a bonding position, it affects counting of a number of layers of tabs after the cross-section is divided, resulting in inaccurate counting of the number of layers of tabs.

Based on the above considerations, to solve the problem, the inventor finds through in-depth studies: There are the following several bonding states of tabs, as shown in FIG. 1 (a solid line in FIG. 1 indicates one tab or a plurality of tabs that are fully bonded). In a case 1, a single tab 111 bonds with no tab, and there is no intersection point on the tab 111. In case 2, two tabs 112 and 113 and more than two tabs (not shown) are not separated after bonding at an intersection point 110, and there is one intersection point 110 on the two tabs 112 and 113. In case 3, two tabs 114 and 115 and more than two tabs (not shown) are bonded at an intersection point and then are separated from a position of the intersection point again, and there is one intersection point 120 on the two tabs 114 and 115. In case 4, two tabs 116 and 117 and more than two tabs (not shown) bond at a first intersection point 130, temporarily are not separated, and are separated from a second intersection point 140. If the two tabs are bonded again in a middle tab position 40 (the situation shown in the figure), there are a total of three intersection points 130, 140, and 150 on the two tabs 116 and 117. If the two tabs are separated at the roots of the tabs (near one side of the electrode plate) or the tails of the tabs (not shown), there are a total of two intersection points on the line drawing. In case 5, in a combined mode, the tabs of the previous modes are bonded at different positions, and a number of bonding intersections depends on a bonding position. In FIG. 1, there are a total of three intersection points 160, 170, and 180 on the four tabs 118, 119, 120, and 121.

Based on this, the applicant provides the following several embodiments, so that on the basis of performing automatic recognition of folding of the tab and improving the inspection efficiency, the several tab bonding states described above can be fully considered in determining the number of layers of tabs, and the number of layers of battery tabs can be accurately inspected to reduce the missed inspection rate.

First, an apparatus and a system for performing inspection methods of all embodiments of the present application are described.

Figure 2:
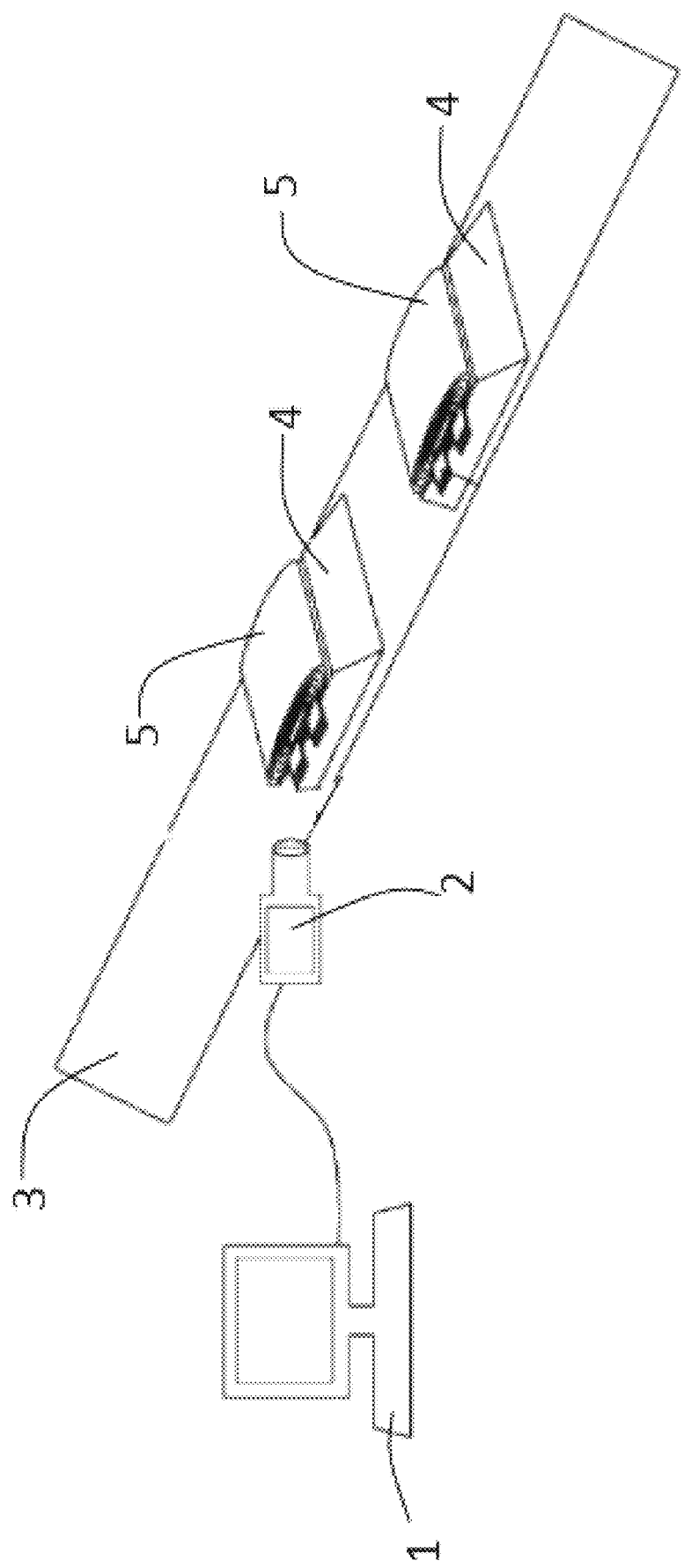
FIG. 2 is a schematic structural diagram of a system for inspecting a battery tab according to some embodiments of the present application.

Referring to FIG. 2, an optional inspection system for performing the inspection method of the embodiment provided by the present application is described. The inspection system includes: a processing apparatus 1, a camera apparatus 2, and a transmission apparatus, where the transmission apparatus includes: a conveyor belt 3 and one or more trays 4 located on the conveyor belt 3, where the tray 4 is configured to place a battery 5 to be inspected. A camera of the camera apparatus 3 is aimed at the battery 5 to be inspected on the tray 4, to photograph a sectional view of a plurality of layers of tabs on the battery 5 to be inspected. The processing apparatus 1 is connected to the camera apparatus 2 to obtain the sectional view of the a plurality of layers of tabs on the battery 5 to be inspected captured by the camera apparatus 2, and perform the method for inspecting a battery tab in the embodiment of the present application to automatically identify folding of the tab. The method for inspecting a battery tab disclosed in the embodiment of the present application can be applied to the forgoing apparatus or system for inspecting a battery tab, but is not limited thereto, and the above is only an example.

Next, an embodiment of the method for inspecting a battery tab of the present application is described.

Figure 3:
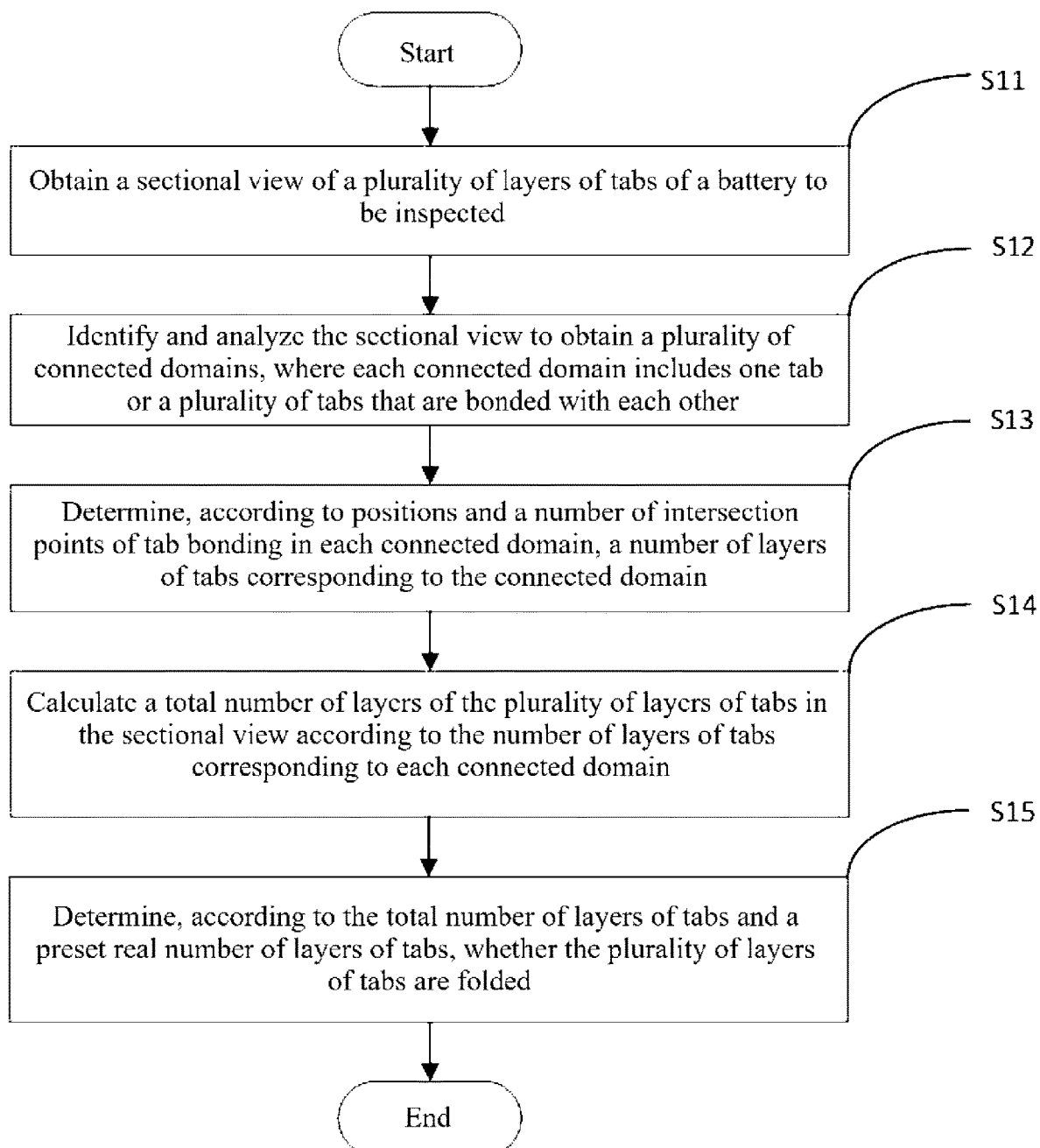
FIG. 3 is a schematic flowchart of a method for inspecting a battery tab according to some embodiments of the present application.

The method for inspecting a battery tab according to some embodiments of the present application, as shown in FIG. 3, includes:

step S11: obtaining a sectional view of a plurality of layers of tabs of a battery to be inspected;

step S12: identifying and analyzing the sectional view to obtain a plurality of connected domains, where each connected domain includes one tab or a plurality of tabs that are bonded with each other;

step S13: determining, according to positions and a number of intersection points of tab bonding in each connected domain, a number of layers of tabs corresponding to the connected domain;

step S14: calculating a total number of layers of the plurality of layers of tabs in the sectional view according to the number of layers of tabs corresponding to each connected domain; and step S15: determining, according to the total number of layers of tabs and a preset real number of layers of tabs, whether the plurality of layers of tabs are folded.

Figure 4:
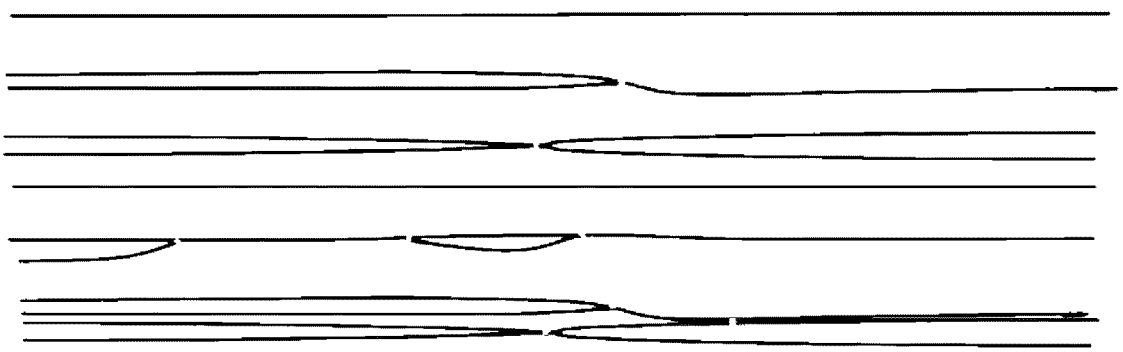
FIG. 4 is a sectional view of a battery tab according to some embodiments of the present application.

It is assumed that the obtained sectional view of the plurality of layers of tabs of the battery to be inspected is shown in FIG. 4, where a solid line represents one tab or a plurality of fully tabs that are bonded with each other, and the sectional view is identified and analyzed to obtain a plurality of connected domains, where the connected domain is an image region composed of adjacent foreground pixels with the same pixel value in the image. Since there is no connected domain between tabs that are not bonded with each other in the sectional view, only a single tab or a plurality of tabs that are bonded to each other has/have a connected domain. Therefore, connected domain analysis is performed on the sectional view in FIG. 4, so that a plurality of connected domains that are not bonded to each other in the plurality of layers of tabs can be found. A connected domain represents a tab, or a plurality of tabs that are bonded to each other.

Figure 5:
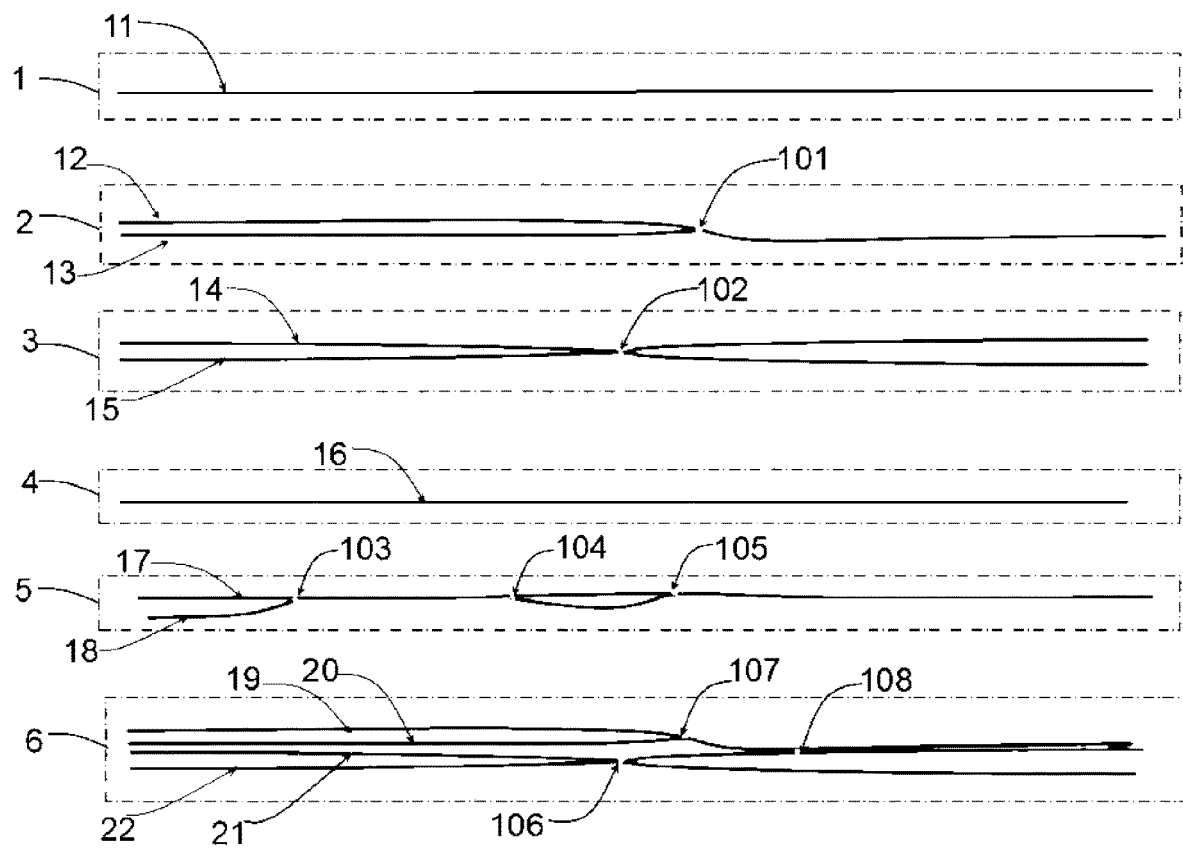
FIG. 5 is a schematic diagram in which the sectional view shown in FIG. 4 is divided into connected domains.

FIG. 5 is a schematic diagram in which the sectional view shown in FIG. 4 is divided into connected domains. Each dashed-line box represents a connected domain. FIG. 4 may be identified to obtain six connected domains (1, 2, 3, 4, 5, and 6). The number of layers of tabs corresponding to each connected domain is determined according to the positions and the number of the intersection points of tab bonding in the connected domain, so that the obtained number of layers of tabs in each connected domain is more accurate. The total number of layers of tabs in the plurality of layers of tabs in the sectional view is determined according to the obtained number of layers of tabs corresponding to each connected domain. Compared with directly identifying the total number of layers of tabs in the sectional view, the technical solution provided by the present application first proposes a technical solution that performs inspection based on connected domains and determines the intersection points of tab bonding. The obtained sectional view of the plurality of layers of tabs is divided into the plurality of connected domains based on the possible intersection points of tab bonding, and then the tabs in each connected domain are calculated separately, and then calculated results are summed up, so that the result of the total number of layers of tabs of the obtained sectional view is more accurate. Therefore, in determining, according to the total number of layers of tabs and the preset real number of layers of tabs, whether the plurality of layers of tabs are folded, the determining accuracy is higher and the missed inspection rate can be effectively reduced. In addition, the method for inspecting a battery tab in the embodiment can automatically identify the folded tab by introducing connected domains and performing related image recognition, which not only improves the inspection efficiency, but also effectively reduces the missed inspection rate.

According to some embodiments of the present application, the determining, according to positions and a number of intersection points of tab bonding in each connected domain, a number of layers of tabs corresponding to the connected domain includes: identifying the positions and the number of intersection points of tab bonding in each connected domain; if the number of intersection points in the connected domain is 0, determining that a number of layers of tabs in the connected domain is 1; if the number of intersection points in the connected domain is 1 or more, dividing the connected domain into a plurality of regions according to the positions of the intersection points, where each region does not include the intersection point, and the connected domain includes a plurality of tabs that are bonded with each other; and determining the number of layers of tabs of the connected domain according to a number of connected sub-regions in each of the plurality of regions, where each connected sub-region includes a non-bonded part or a fully bonded part of the plurality of tabs that are bonded with each other.

In determining the corresponding number of layers of tabs in each connected domain, the skeleton of the connected domain can be extracted. The skeleton herein can be understood as the lines of the connected domain. The positions and the number of intersection points on the skeleton can be calculated. Determining is performed according to the positions and the number of intersection points.

If a number of intersection points in a connected domain is 0, it can be determined that the connected domain includes a single tab, and it can be directly determined that the number of layers of tabs in the connected domain is 0. As shown in FIG. 5, the number of intersection points in the first connected domain 1 is 0, and then the first connected domain 1 includes a single tab 11. The number of intersection points in the fourth connected domain 4 is 0, and then the fourth connected domain 4 includes a single tab 16.

If a number of intersection points in a connected domain is one or more, the connected domain includes a plurality of tabs that are bonded with each other. As shown in FIG. 5, the number of intersection points 101 in the second connected domain 2 is one, and the second connected domain 2 includes two tabs 12 and 13 that are bonded to each other. The number of intersection points 102 in the third connected domain 3 is one, and the third connected domain 3 includes two tabs 14 and 15 that are bonded to each other. The number of intersection points 103, 104, and 105 in the fifth connected domain 5 is three, and the fifth connected domain 5 includes two tabs 17 and 18 that are bonded to each other. The number of intersection points 106, 107, and 108 in the sixth connected domain 6 is three, and the sixth connected domain 6 includes four tabs 19, 20, 21, and 22 that are bonded to each other.

If a plurality of tabs that are bonded with each other exist in the connected domain, it is necessary to divide the connected domain into the plurality of regions along a length extension direction of the tab according to the position of the intersection point. Because each region does not include the position of the intersection point, this avoids that because a region of the obtained plurality of regions includes bonding of tabs, two bonded parts are considered as a connected sub-region. In the present embodiment, each connected sub-region of each region includes a non-bonded part or a fully bonded part of the plurality of tabs that are bonded with each other, which helps to accurately determine the number of layers of tabs in each region.

Figure 6:
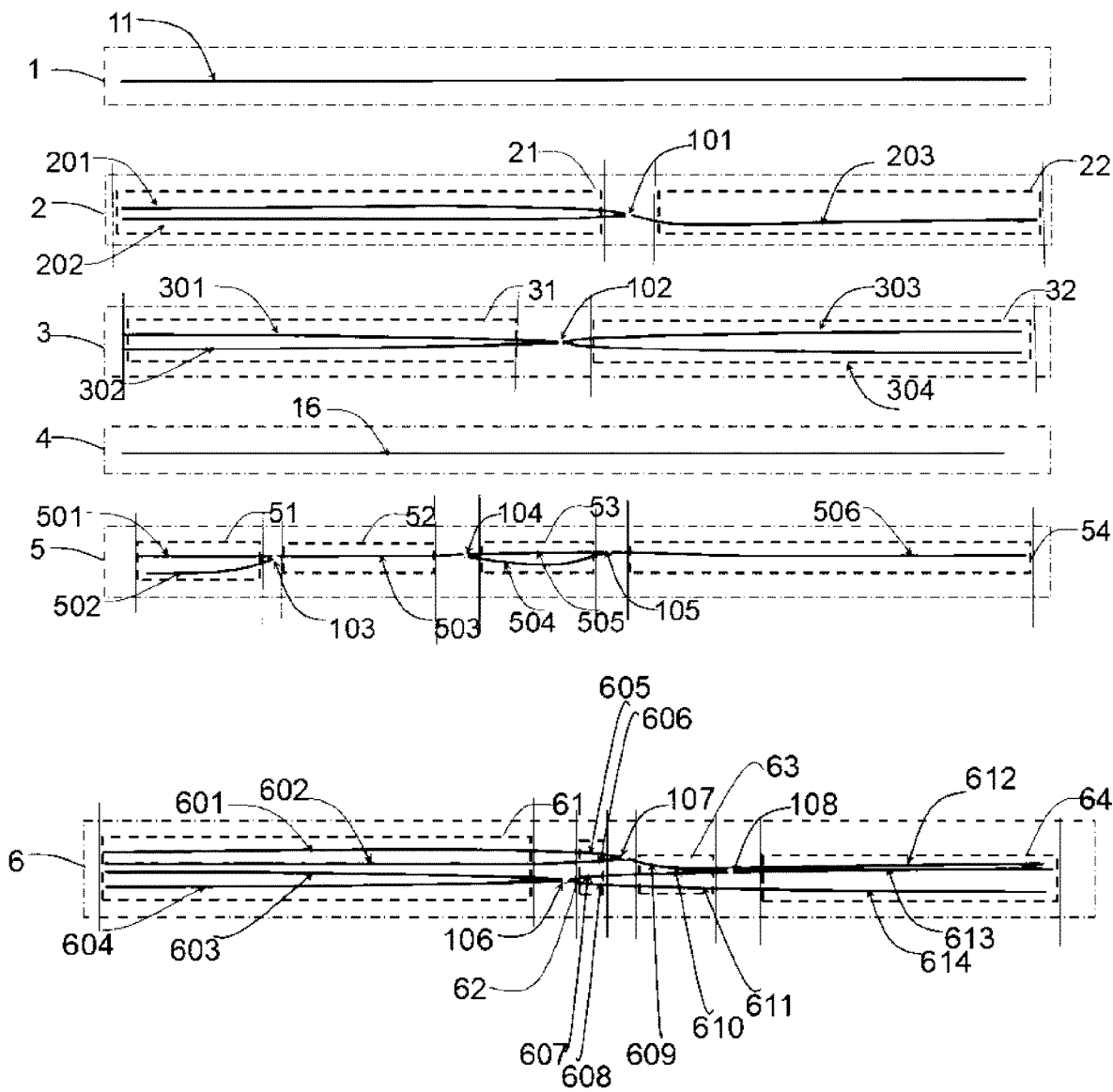
FIG. 6 is a schematic diagram in which the sectional view shown in FIG. 4 is divided into regions.

FIG. 6 is a schematic diagram in which a sectional view shown in FIG. 4 is divided into regions, where each thin dashed-line box represents a connected domain, and each thick dashed-line box represents a region.

There is one intersection point 101 in the second connected domain 2, and the second connected domain 2 can be divided into two regions 21 and 22 along the length extension direction of the tab. The region 21 includes two connected sub-regions 201 and 202, and each connected sub-region is a part where tabs are not bonded to each other. The connected sub-region 201 is a part where the tab 12 is not bonded to the tab 13, and the connected sub-region 202 is a part where the tab 13 is not bonded to the tab 12. The other region 22 includes a connected sub-region 203, and the connected sub-region 203 is a part where the tab 12 and the tab 13 are fully bonded to each other.

There is one intersection point 102 in the third connected domain 3, and the third connected domain 3 can be divided into two regions 31 and 32 along the length extension direction of the tab. The region 31 includes two connected sub-regions 301 and 302, and each connected sub-region is a part where tabs are not bonded to each other. The connected sub-region 301 is a part where the tab 14 is not bonded to the tab 15, and the connected sub-region 302 is a part where the tab 15 is not bonded to the tab 14. The other region 32 also includes two connected sub-regions, and each connected sub-region is a part where tabs are not bonded to each other. The connected sub-region 303 is a part where the tab 14 is not bonded to the tab 15, and the connected sub-region 304 is a part where the tab 15 is not bonded to the tab 14.

There are three intersection points in the fifth connected domain 5, and the fifth connected domain 5 can be divided into four regions 51, 52, 53, and 54 along the length extension direction of the tab. The two regions 51 and 53 both include two connected sub-regions, and the region 51 includes connected sub-regions 501 and 502. The connected sub-region 501 is a part where the tab 17 is not bonded to the tab 18, and the connected sub-region 502 is a part where the tab 18 is not bonded to the tab 17. The region 53 includes connected sub-regions 504 and 505, the connected sub-region 504 is a part where the tab 18 is not bonded to the tab 17, and the connected sub-region 505 is a part where the tab 17 is not bonded to the tab 18. The other two regions 52 and 54 both include one connected sub-region, the region 52 includes a connected sub-region 503, the region 54 includes a connected sub-region 506, and both the connected sub-regions 503 and 506 are a part where the tabs 17 and 18 are fully bonded with each other.

There are three intersection points 106, 107 and 108 in the sixth connected domain 6, the sixth connected domain 6 can be divided into four regions 61, 62, 63, and 64 along the length extension direction of the tab, and both the regions 61 and 62 include four connected sub-regions. The region 61 includes connected sub-regions 601, 602, 603, and 604, the region 62 includes connected sub-regions 605, 606, 607, and 608, and each connected sub-region is a part where the tabs 19, 20, 21, and 22 are not bonded with each other. The regions 63 and 64 both include three connected sub-regions, the region 63 includes connected sub-regions 609, 610, and 611, the connected sub-region 609 is a part where the tab 19 and the tab 20 are fully bonded with each other, the connected sub-region 610 is the tab 21, and the connected sub-region 611 is the tab 22. The region 64 includes connected sub-regions 612, 613, and 614, the connected sub-region 612 is a part where the tab 19 and the tab 20 are fully bonded with each other, the connected sub-region 613 is the tab 21, and the connected sub-region 614 is the tab 22.

According to some embodiments of the present application, optionally, the dividing the connected domain into a plurality of regions according to the positions of the intersection points, where each region does not include the intersection point includes: taking a preset offset along the extension direction of the connected domain on two sides of the position of each intersection point as a region boundary; and dividing the connected domain into the plurality of regions according to the region boundary, where each region does not include the intersection point.

As shown in FIG. 6, FIG. 6 is a schematic diagram in which a region boundary of a sectional view shown in FIG. 4 is obtained for region division. In FIG. 6, a short solid line perpendicular to the length extension direction of the connected domain indicates a region boundary. In dividing the connected domain into a plurality of regions according to the position of the intersection point, a specific offset is taken as the region boundary on two sides of each intersection point according to the extension direction of the tab (that is, the extension direction of the connected domain), and the two ends of the connected domain are automatically determined as region boundaries. According to the region boundaries, the connected domain is divided into a plurality of regions that do not include intersection points. The preset offset can be set according to actual needs, for example: The preset offset can be 5 pixels, 8 pixels, 10 pixels, etc.

Since the tabs near the intersection point may still be bonded, if the region is divided directly based on the position of the intersection, the determined number of connected sub-regions in the region may still be inaccurate. In the embodiment, the preset offset along the extension direction of the connected domain on two sides of the position of each intersection point is taken as the region boundary. This avoids dividing a tab near the intersection point into the region, to avoid that a tab at the boundary is counted repeatedly because each divided region is excessively narrow, thereby further improving the inspection accuracy of the number of connected sub-regions in the region.

According to some embodiments of the present application, optionally, the identifying and analyzing the sectional view to obtain a plurality of connected domains, where each connected domain includes one tab or a plurality of tabs that are bonded with each other includes: eliminating a tab bonding hole with an area smaller than a preset threshold in the sectional view, to obtain a first image; and performing connected domain analysis on the first image to obtain the plurality of connected domains, where each connected domain includes one tab or a plurality of tabs that are bonded with each other.

In the fifth connected domain 5 shown in FIG. 6, when there is a tab bonding hole (at the position of the region 53 of the fifth connected domain 5 in FIG. 6), if the area of the tab bonding hole is sufficiently small, the tab bonding hole can be eliminated to improve inspection efficiency. After the small-area tab bonding hole is eliminated, since the tab is certainly not bonded at an end (the left side in FIG. 6) close to the battery, it does not affect the determining of the number of layers of tabs in the connected domain. The preset threshold can be set according to actual needs, for example: The preset threshold may be 25 pixels, 20 pixels, 15 pixels, etc.

Figure 7:
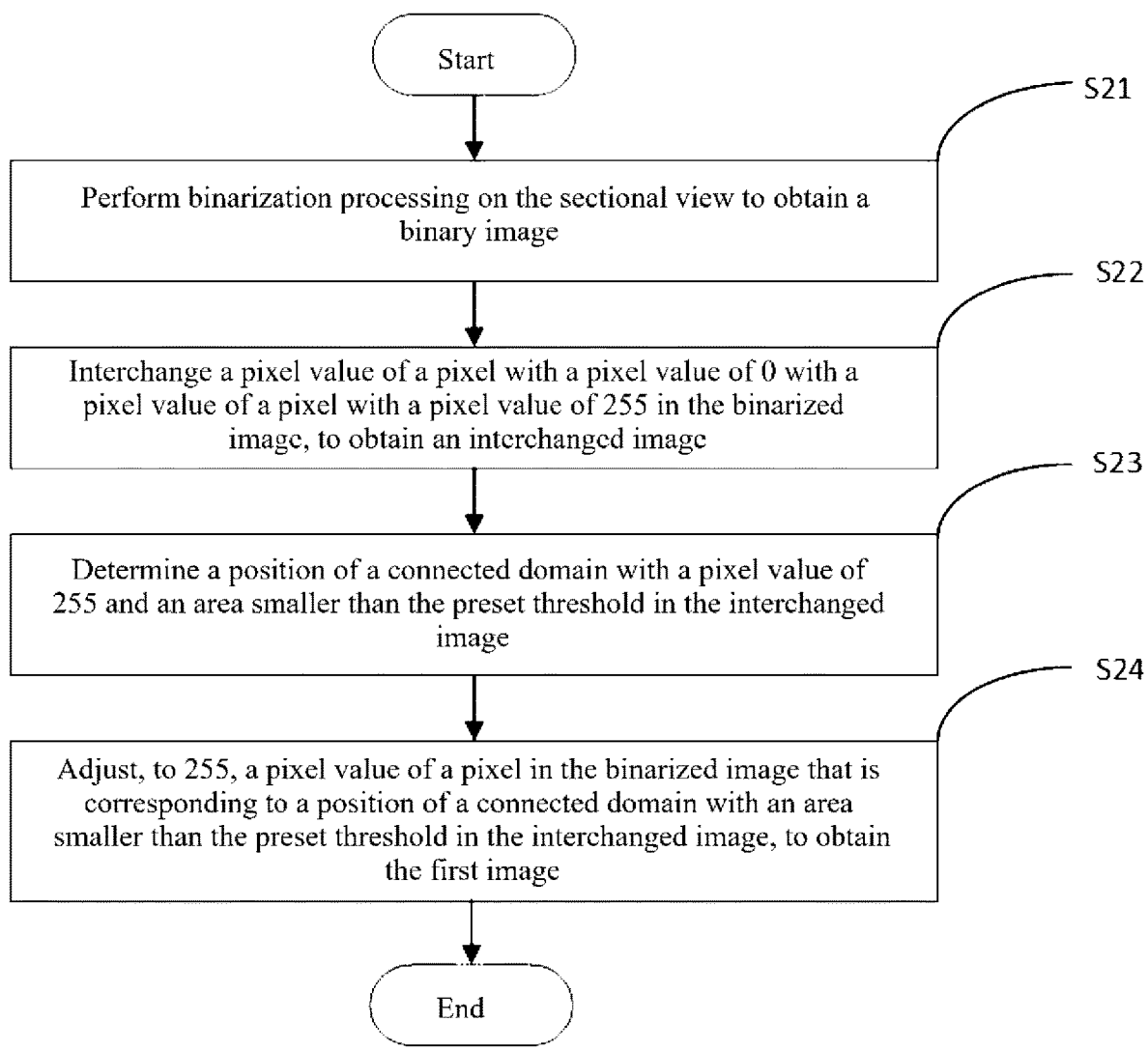
FIG. 7 is a schematic flowchart of eliminating a tab bonding hole in a method for inspecting a battery tab according to some embodiments of the present application.
Figure 8:
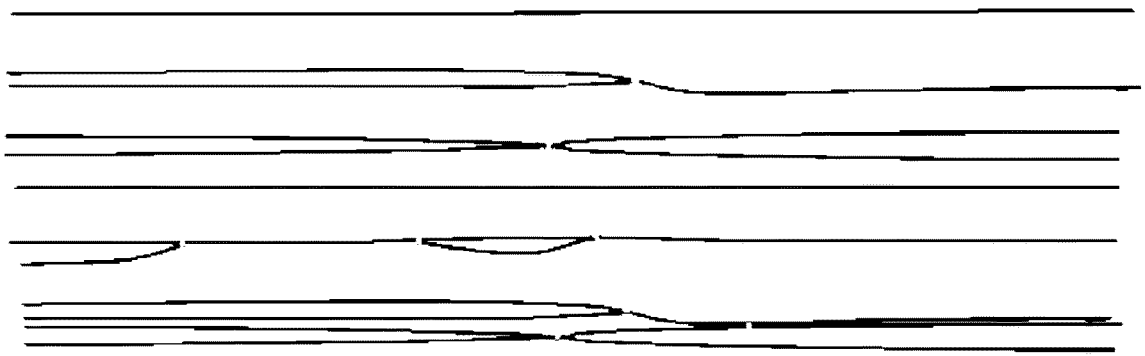
FIG. 8 is a sectional view in the flowchart shown in FIG. 7 according to the present application.
Figure 9:
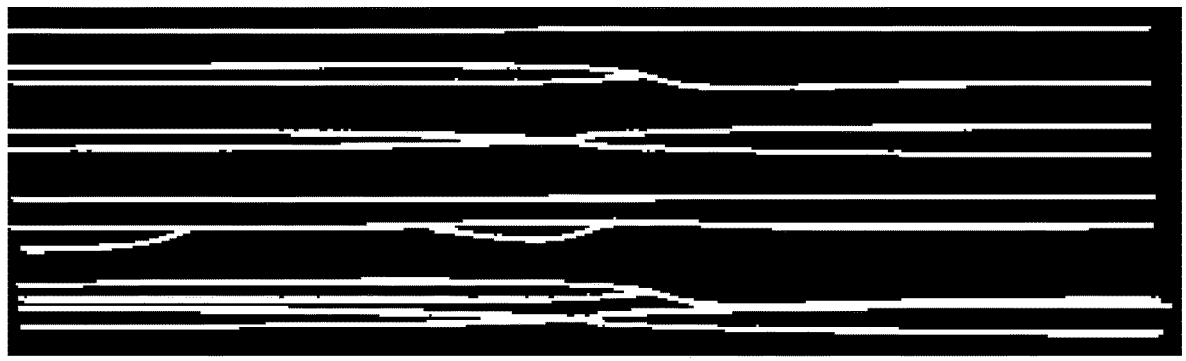
FIG. 9 is a binary image obtained after binarizing the sectional view in the flowchart shown in FIG. 7 according to the present application.

A specific process of eliminating a tab bonding hole with an area smaller than a preset threshold in the sectional view, to obtain a first image is shown in FIG. 7, and includes:

step S21: performing binarization processing on the sectional view to obtain a binary image, where the sectional view is shown in FIG. 4, and the binary image is shown in FIG. 8;

step S22: interchanging a pixel value of a pixel with a pixel value of 0 with a pixel value of a pixel with a pixel value of 255 in the binarized image, to obtain an interchanged image, as shown in FIG. 9;

step S23: determining a position of a connected domain with a pixel value of 255 and an area smaller than the preset threshold in the interchanged image; and step S24: adjusting, to 255, a pixel value of a pixel in the binarized image that is corresponding to at a position of a connected domain with an area smaller than the preset threshold in the interchanged image, to obtain the first image.

According to some embodiments of the present application, the eliminating a tab bonding hole with an area smaller than a preset threshold in the sectional view, to obtain a first image includes: performing binarization processing on the sectional view to obtain a binarized image; and setting a pixel at a position of a connected domain with an area smaller than the preset threshold in the binarized image to white, to obtain the first image.

In eliminating the tab bonding hole that may appear in the sectional view, binarization processing may be first performed on the sectional view to obtain the binarized image. The pixel value of the pixel of the tab in the binarized image is 255 and is displayed in white. The pixel value of the pixel in the background is 0 and is displayed in black. In the binarized image, the black connected domain with an area smaller than the preset threshold can be determined as the tab bonding hole. The pixel at the position of the black connected domain with an area smaller than the preset threshold is set to white, that is, the pixel value changes to 255, so that the color of the tab bonding hole is the same as that of the tab and the tab bonding hole and the tab are visually integrated to eliminate the tab bonding hole.

According to some embodiments of the present application, the setting a pixel at a position of a connected domain with an area smaller than the preset threshold in the binarized image to white, to obtain the first image includes: interchanging a pixel value of a pixel with a pixel value of 0 with a pixel value of a pixel with a pixel value of 255 in the binarized image, to obtain an interchanged image; determining a position of a connected domain with a pixel value of 255 and an area smaller than the preset threshold in the interchanged image; and adjusting, to 255, a pixel value of a pixel in the binarized image that is corresponding to a position of a connected domain with an area smaller than the preset threshold in the interchanged image, to obtain the first image.

In eliminating the tab bonding hole, the pixel at the position of the black connected domain with an area smaller than the preset threshold can be directly set to white to eliminate the tab bonding hole. Another implementation is provided in the embodiment. A pixel value of a pixel with a pixel value of 0 may be first interchanged with a pixel value of a pixel with a pixel value of 255 in the binarized image, to obtain an interchanged image. In the exchanged image, a pixel value of a pixel of the tab is 0 and is displayed in black, and a pixel value of a pixel in the background is 255 and is displayed in white. The white connected domain with an area smaller than the preset threshold is identified, and a pixel value in the binarized image that is corresponding to a position of the white connected domain with an area smaller than the preset threshold in the interchanged image is adjusted to 255, to obtain the first image.

According to some embodiments of the present application, optionally, the determining the number of layers of tabs of the connected domain according to a number of connected sub-regions in each of the plurality of regions includes: determining the number of connected sub-regions in each of the plurality of regions; and taking the greatest number of connected sub-regions in the plurality of regions in the connected domain as the number of layers of tabs of the connected domain.

For illustration in conjunction with FIG. 4, FIG. 5, and FIG. 6, a second connected domain 2 in FIG. 5 is divided into two regions 21 and 22, and the region 21 includes two connected sub-regions 201 and 202, and the region 22 includes one connected sub-region 203. The maximum number of connected sub-regions in the two regions 21 and 22 is 2, and therefore, the number of layers of tabs of the second connected domain 2 is 2 layers.

A third connected domain 3 is divided into two regions 31 and 32, and the region 31 includes two connected sub-regions 301 and 302, and the region 32 includes two connected sub-regions 303 and 304. The maximum number of connected sub-regions in the two regions 31 and 32 is 2, and therefore, the number of layers of tabs of the second connected domain 2 is 2 layers.

A fifth connected domain 5 is divided into four regions 51, 52, 53, and 54, the region 51 includes two connected sub-regions 501 and 502, the region 52 includes one connected sub-region 503, the region 53 includes two connected sub-regions 504 and 505, and the region 54 includes one connected sub-region 506. The maximum number of connected sub-regions in the four regions 51, 52, 53, and 54 is 2, and therefore, the number of layers of tabs in the fifth connected domain 5 is 2 layers.

A sixth connected domain 6 is divided into 4 regions 61, 62, 63, and 64, the region 61 includes four connected sub-regions 601, 602, 603, and 604, the region 62 includes four connected sub-regions 605, 606, 607, and 608, the region 63 includes three connected sub-regions 609, 610, and 611, and the region 64 includes three connected sub-regions 612, 613, and 614. The maximum number of connected sub-regions in the four regions 61, 62, 63, and 64 is 4, and therefore, the number of layers of tabs of the sixth connected domain 6 is 4 layers.

When the tab is folded, numbers of layers of tabs in some regions in the sectional view increase, while numbers of layers of tabs in some regions decrease. Therefore, to accurately inspect whether the tab is folded, it is necessary to take the maximum number of connected sub-regions in the plurality of regions of the connected domain as the number of layers of tabs in the connected domain. In the embodiment, the maximum number of connected sub-regions in the plurality of regions in the connected domain is taken as the number of layers of tabs in the connected domain, which helps to accurately calculate the number of layers of tabs in the region, thereby accurately inspecting whether the tab is folded.

According to some embodiments of the present application, optionally, the determining the number of connected sub-regions in each of the plurality of regions includes: obtaining lengths of all connected sub-regions in each of the plurality of regions; and determining the number of connected sub-regions in each region according to a number of connected sub-regions that are in the region and whose lengths are greater than 1/N times of the longest connected sub-region in the region, where N is greater than 0.

Figure 10:
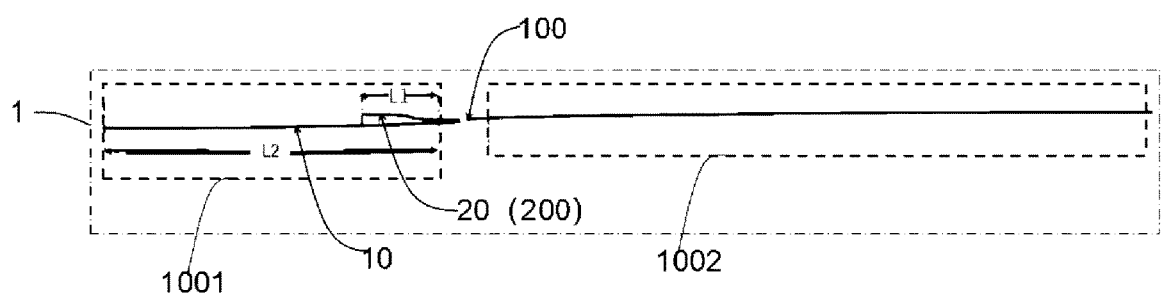
FIG. 10 is a schematic diagram in which a burr appears on a battery tab according to some embodiments of the present application.

As shown in FIG. 10, if a burr 200 appears on a surface of a tab 11 in a connected domain 1, in a region 1001 that is of regions 1001 and 1002 divided according to an intersection point 100 and in which the burr 200 appears, a number of connected sub-regions that can be easily determined is greater than a real number of layers of tabs in the region 1001, resulting in an inaccurate final test result.

The inventor finds that if the number of layers of tabs is determined by setting sampling points on the line graph of the plurality of layers of tabs of the battery to be inspected, the problem of how to select a sampling point interval (a step size) arises, that is, a pixel interval at which the number of tabs in the vertical direction is counted. If an excessively large step size is selected, a part of tabs is separated and is not counted, which easily leads to the count being less than a real value and incorrect determining of folding of the tab. A small step size can reduce the problem of missed counting to a certain extent, but is more sensitive to a burr generated by local abnormal division and leads to a larger count. Besides, it increases the calculation amount of the program.

In the embodiment, before counting the number of layers of tabs in each connected domain, it is necessary to eliminate a local burr, so as to avoid mistakenly counting the burr as a tab. A processing method is: After each connected domain is divided into regions, lengths of connected sub-regions in each region are determined, and a maximum value of the lengths of all connected sub-regions in the region is determined. When a length of a connected sub-region in the region is less than 1/N*the maximum length, in counting the number of connected sub-regions in the region, the connected sub-region is not counted. For example, assuming that the region 1001 in FIG. 10 includes two connected sub-regions 10 and 20, a length of the connected sub-region 10 is L2, and a length of the connected sub-region 20 is L1, if the length L1 of the connected sub-region 20 is less than 1/N*L2, the connected sub-region 20 is not counted. Only the connected sub-region 10 whose length is greater than or equal to 1/N*L2 in the region 1001 is counted, where N is greater than 0, N is an empirical value, and N usually is a value between 5 and 6.

The number of connected sub-regions in each region is determined according to a number of connected sub-regions that are in the region and whose lengths are greater than 1/N times of the longest connected sub-region in the region, so as to avoid incorrectly determining the burr as a bonded tab. Therefore, the burr interference is eliminated, and the inspection accuracy of the number of layers of tabs is further improved.

Figure 11:
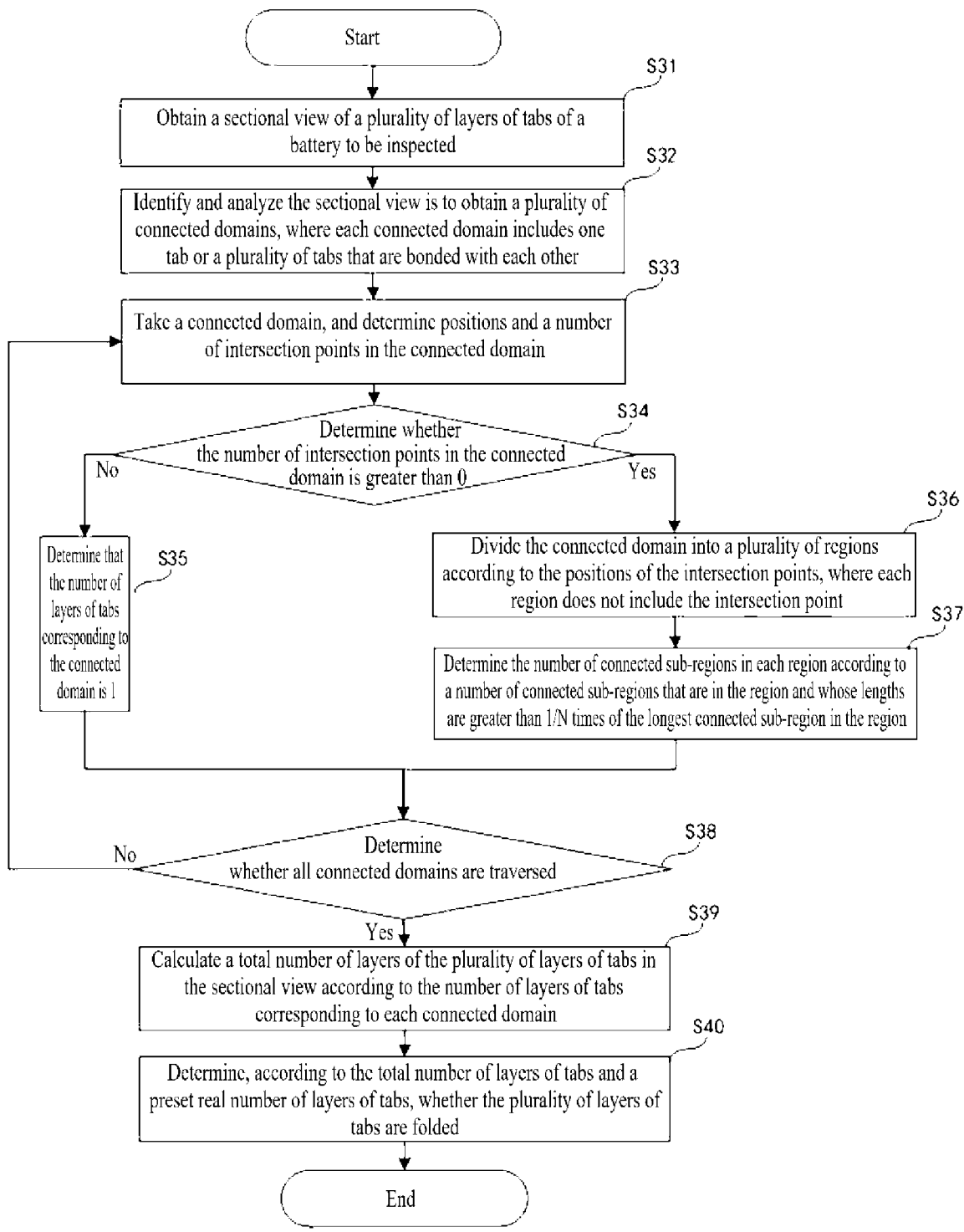
FIG. 11 is an example schematic flowchart of a method for inspecting a battery tab according to some embodiments of the present application.

The following is some embodiments of the present application. FIG. 11 specifically includes:

In S31, a sectional view of a plurality of layers of tabs of a battery to be inspected is obtained.

In S32, the sectional view is identified and analyzed to obtain a plurality of connected domains, where each connected domain includes one tab or a plurality of tabs that are bonded with each other.

After the sectional view is obtained, binarization processing is performed on the sectional view to obtain a binarized image. Binarization processing is to change a grayscale value of a point on the image to 0 or 255, that is, to make the entire image have the obvious black and white effect. In the embodiment, the pixel value of the pixel point of the tab in the sectional view is changed to 255, and the pixel is displayed in white. The pixel value of the pixel in the background is changed to 0, and the pixel is displayed in black.

Connected domain analysis is performed on the binarized image to obtain the plurality of connected domains, where each connected domain includes at least one tab or a plurality of tabs that are bonded with each other. Each connected domain may be a tab or a background interference, which can be screened according to length characteristics of the tab, for example: a length of the tab is generally a fixed value, a connected domain whose length is roughly the same as the fixed value can be determined as a required connected domain, and a connected domain whose length is excessively short or long compared with the fixed value can be determined as interference noise.

In S33, a connected domain is taken, and positions and a number of intersection points in the connected domain are determined.

The positions and the number of intersection points in the connected domain can be calculated by extracting the skeleton of the connected domain.

In S34, it is determined whether the number of intersection points in the connected domain is greater than 0, and if the number is not greater than 0, step S35 is performed, otherwise, step S36 is performed.

In S35, it is determined that the number of layers of tabs corresponding to the connected domain is 1.

Referring to FIG. 5, if a number of intersection points in a connected domain is 0, it can be determined that the connected domain includes a single tab, and it can be directly determined that the number of layers of tabs in the connected domain is 0. If a number of intersection points in a connected domain is one or more, the connected domain includes a plurality of tabs that are bonded with each other. In this case, it is necessary to continue to perform step S36 to further determine a number of layers of the plurality of tabs that are bonded with each other in the connected domain.

In S36, the connected domain is divided into a plurality of regions according to the positions of the intersection points, where each region does not include the intersection point.

If a region includes an intersection point of two intersecting tabs, the two tabs with the intersection point are considered as a connected sub-region in subsequent determining of the number of connected sub-regions in the region, which leads to inaccurate inspection of the number of connected sub-regions in the region. Therefore, it is necessary to divide the connected domain into a plurality of regions along a length extension direction of the tab according to the position of the intersection point, and each region does not include the position of the intersection point, which helps to accurately determine the number of layers of tabs in each region.

Optionally, since the tabs near the intersection point may still be bonded, if the region is divided directly based on the position of the intersection, the determined number of connected sub-regions in the region may still be inaccurate. In the embodiment, the preset offset along the extension direction of the connected domain on two sides of the position of each intersection point is taken as the region boundary. This avoids dividing a tab near the intersection point into the region, thereby further improving the inspection accuracy of the number of connected sub-regions in the region.

In S37, the number of connected sub-regions in each region is determined according to a number of connected sub-regions that are in the region and whose lengths are greater than 1/N times of the longest connected sub-region in the region.

If a burr appears on a surface of a tab in a connected domain, in a region that is of regions divided according to an intersection point and in which the burr appears, a number of connected sub-regions that can be easily determined is greater than a real number of layers of tabs in the region, resulting in an inaccurate final test result. Therefore, in the embodiment, before counting the number of layers of tabs in each connected domain, it is necessary to eliminate a local burr, so as to avoid mistakenly counting the burr as a tab. The specific processing method is as follows:

The length of the connected sub-region in each region is determined, the maximum value max_length of lengths of all connected sub-regions in the region is determined, when the length of the connected sub-region in the region is less than 1/N*max_length, in counting the number of connected sub-regions in the region, the connected sub-region is not counted and only a connected sub-region whose length is greater than or equal to 1/N*max_length in this region is counted. N is greater than 0, N is an empirical value, and N usually is a value between 5 and 6.

When the tab is folded, numbers of layers of tabs in some regions in the sectional view increase, while numbers of layers of tabs in some regions decrease. Therefore, to accurately inspect whether the tab is folded, it is necessary to take the maximum number of connected sub-regions in the plurality of regions of the connected domain as the number of layers of tabs in the connected domain.

In S38, it is determined whether all connected domains are traversed. If yes, step S39 is performed. Otherwise, return to perform step S33.

After steps S35 and S37 are performed, step S38 is performed to determine whether all connected domains are traversed, and if all connected domains are traversed, step S39 continues to be performed to further determine the total number of layers of multi-layered tabs in the sectional view. If not all the connected domains are traversed, step S33 needs to be performed again to continue to analyze the connected domains for which the number of layers of tabs is not determined.

In S39, a total number of layers of the plurality of layers of tabs in the sectional view is calculated according to the number of layers of tabs corresponding to each connected domain.

The total number of layers of tabs in the multi-layer tab in the sectional view can be obtained by adding the number of layers of tabs corresponding to each connected domain. The example of FIG. 5 is used. The number of layers of tabs corresponding to the first connected domain is 1, the number of layers of tabs corresponding to the second connected domain is 2, the number of layers of tabs corresponding to the third connected domain is 2, the number of layers of tabs corresponding to the fourth connected domain is 1, the number of layers of tabs corresponding to the fifth connected domain is 2, and the number of layers of tabs corresponding to the sixth connected domain is 4. In this case, in the sectional view corresponding to FIG. 5, the total number of layers of the plurality of layers of tabs in FIG. 4 is 12.

In S40, it is determined, according to the total number of layers of tabs and a preset real number of layers of tabs, whether the plurality of layers of tabs are folded.

When the battery tab is folded, the number of layers of the battery tab increases. By inspecting a number of layers of the battery tab and determining whether the number of layers of the battery tab is the same as a real number of layers of the tab, it is determined whether the tab in the battery is folded. In the above example, the total number of layers of the plurality of layers of tabs in the sectional view is 12. Assuming that the real number of layers of tabs is 12, the total number of layers of tabs is the same as the preset real number of layers of tabs and the plurality of layers of tabs in the sectional view are not folded. Assuming that the real number of layers of tabs is 10, the plurality of layers of tabs in the sectional view are folded.

In the method for inspecting a battery tab in the embodiment, in a case that tabs may be bonded, a pattern of an intersection point generated by the bonding of the tabs is analyzed, it is proposed to divide the connected domain into a plurality of regions according to the intersection point of tab bonding by taking the connected domain as a unit, and connected domain analysis is performed on each region to count the number of tabs. Compared to directly identifying the total number of layers of tabs in the sectional view, the result of the total number of layers of tabs in the sectional view is more accurate. Therefore, in determining, according to the total number of layers of tabs and the preset real number of layers of tabs, whether the plurality of layers of tabs are folded, the determining accuracy is higher and the missed inspection rate can be effectively reduced. The method for inspecting a battery tab in the embodiment can automatically identify folding of a tab, and can not only improve the inspection efficiency, but also effectively reduce the missed inspection rate. In addition, for some abnormal burrs appearing in the cross-section of the tab, it is proposed to determine the number of connected sub-regions in each region according to the number of connected sub-regions that are in the region and whose lengths are greater than 1/N times of the longest connected sub-region in the region, to eliminate burr interference, improve the inspection accuracy of the number of layers of tabs, and further reduce the missed inspection rate.

It is found through experiments that, based on data of cells produced on the production line, when the method for inspecting a battery tab of the embodiment is used to determine folding of the tab, the overkill rate is within 3% and the missed kill rate is controlled within 0.7%. Moreover, the probability of such burr in the actual production line data is about 0.1%. Before the method for inspecting a battery tab of the embodiment is used to enter the logic of counting the number of layers of tabs, abnormal interference of the local burr is eliminated, and missed kill resulting from burrs caused by abnormal tab division is reduced.

Figure 12:
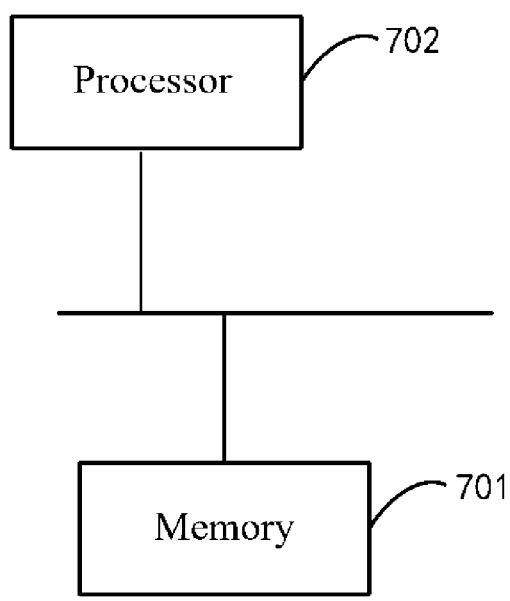
FIG. 12 is a schematic structural diagram of an apparatus for inspecting a battery tab according to some embodiments of the present application.

Referring to FIG. 12, an apparatus for inspecting a battery tab for implementing the inspection methods of all embodiments of the present application is described. The inspection apparatus includes: at least one processor 701; and a memory 702 communicatively connected to the at least one processor 701; where the memory 702 stores instructions that can be executed by the at least one processor 701, and when executed by the at least one processor 701, the instructions cause the at least one processor 701 to execute the method for inspecting a battery tab in all embodiments of the present application. The apparatus shown in FIG. 3 does not include a camera apparatus. Therefore, an external camera apparatus can be configured to photograph, and the apparatus for inspecting a battery tab directly obtains, from the external camera apparatus, a photographed sectional view of a plurality of layers of tabs of a battery to be inspected photographed by the external camera apparatus.

The memory 702 and the processor 701 are connected by a bus, the bus may include any number of interconnected buses and bridges, and the bus connects various circuits of one or more processors 701 and the memory 702 together. The bus may further link various other circuits such as a peripheral device, a voltage regulator, and a power management circuit together. These are all well-known in the art, and therefore are not further described in the present specification. The bus interface provides an interface between the bus and a transceiver. The transceiver may be one element or multiple elements, for example, multiple receivers and multiple transmitters, to provide a unit configured to communicate with various other apparatuses on a transmission medium. Data processed by the processor 701 is transmitted on a wireless medium by using the antenna. Further, the antenna further receives data and transmits the data to the processor 701.

The processor 701 is responsible for managing the bus and common processing, and may further provide various functions, including timing, a peripheral interface, voltage regulation, power management, and other control functions. The memory 702 may be configured to store data used when the processor 701 performs an operation.

A non-transitory computer-readable storage medium according to some embodiments of the present application stores a computer program. When the computer program is executed by the processor, the method for inspecting a battery tab in any above embodiment is performed.

That is, those skilled in the art can understand that all or some of the steps in the methods of the above embodiments can be performed by instructing related hardware through a program. The program is stored in a storage medium and includes several instructions to enable a device (which may be a single-chip microcomputer, a chip, or the like) or a processor (processor) to perform all or some of the steps of the methods in the embodiments of the present application. The storage medium includes: various mediums that can store program code, such as a USB flash drive, a mobile hard disk, a read-only memory (ROM, Read-Only Memory), a random access memory (RAM, Random Access Memory), a magnetic disk, or an optical disk.

Finally, it should be noted that the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, as long as there is no conflict, the various technical features mentioned in the embodiments can be combined in any manner. The present application is not limited to the specific embodiments disclosed herein but includes all the technical solutions that fall within the scope of the claims.

The invention claimed is:

1. A method for inspecting a battery tab, comprising:
obtaining a sectional view of a plurality of layers of tabs of a battery to be inspected;
identifying and analyzing the sectional view to obtain a plurality of connected domains, wherein each connected domain comprises one tab or a plurality of tabs that are bonded with each other;

determining, based on positions and a number of intersection points of tab bonding in each connected domain, a number of layers of tabs corresponding to the connected domain;

calculating a total number of layers of the plurality of layers of tabs in the sectional view based on the number of layers of tabs corresponding to the connected domain; and determining, based on the total number of layers of tabs and a preset real number of layers of tabs, whether the plurality of layers of tabs are folded.

2. The method according to claim 1, wherein the determining, based on positions and a number of intersection points of tab bonding in each connected domain, a number of layers of tabs corresponding to the connected domain comprises:

identifying the positions and the number of intersection points of tab bonding in the connected domain;

if the number of intersection points in the connected domain is 0, determining that a number of layers of tabs in the connected domain is 1;

if the number of intersection points in the connected domain is 1 or more, dividing the connected domain into a plurality of regions based on the positions of the intersection points, wherein each region does not comprise the intersection point, and the connected domain comprises a plurality of tabs that are bonded with each other; and determining the number of layers of tabs of the connected domain based on a number of connected subdomains in each of the plurality of regions, wherein each connected subdomain comprises a non-bonded part or a fully bonded part of the plurality of tabs that are bonded with each other.

3. The method according to claim 2, wherein the dividing the connected domain into a plurality of regions based on the positions of the intersection points, wherein each region does not comprise the intersection point comprises:

taking a preset offset along an extension direction of the connected domain on two sides of the position of each intersection point as a region boundary; and dividing the connected domain into the plurality of regions based on the region boundary, wherein each region does not comprise the intersection point.

4. The method according to claim 1, wherein the identifying and analyzing the sectional view to obtain a plurality of connected domains, wherein each connected domain comprises one tab or a plurality of tabs that are bonded with each other comprises:

eliminating a tab bonding hole with an area smaller than a preset threshold in the sectional view, to obtain a first image; and performing connected domain analysis on the first image to obtain the plurality of connected domains, wherein each connected domain comprises one tab or a plurality of tabs that are bonded with each other.

5. The method according to claim 4, wherein the eliminating a tab bonding hole with an area smaller than a preset threshold in the sectional view, to obtain a first image comprises:

performing binarization processing on the sectional view to obtain a binary image; and setting a pixel in a position of a connected domain with an area smaller than the preset threshold in the binary image to white, to obtain the first image.

6. The method according to claim 5, wherein the setting a pixel in a position of a connected domain with an area smaller than the preset threshold in the binary image to white, to obtain the first image comprises:

interchanging a pixel value of a pixel with a pixel value of 0 with a pixel value of a pixel with a pixel value of 255 in the binarized image, to obtain an interchanged image;

determining a position of a connected domain with a pixel value of 255 and an area smaller than the preset threshold in the interchanged image; and adjusting, to 255, a pixel value of a pixel in the binary image that is corresponding to a position of a connected domain with an area smaller than the preset threshold in the interchanged image, to obtain the first image.

7. The method according to claim 2, wherein the determining the number of layers of tabs of the connected domain based on a number of connected subdomains in each of the plurality of regions comprises:

determining the number of connected subdomains in each of the plurality of regions; and taking the greatest number of connected subdomains in the plurality of regions in the connected domain as the number of layers of tabs of the connected domain.

8. The method according to claim 7, wherein the determining the number of connected subdomains in each of the plurality of regions comprises:

obtaining lengths of all connected subdomains in each of the plurality of regions; and determining the number of connected subdomains in each region based on a number of connected subdomains that are in the region and whose lengths are greater than 1/N of the longest connected subdomain in the region, wherein N is greater than 0.

9. An apparatus for inspecting a battery tab, comprising:
at least one processor; and a memory communicatively coupled to the at least one processor, wherein the memory stores instructions executable by the at least one processor, and when executed by the at least one processor, the instructions cause the at least one processor to perform the method for inspecting a battery tab according to claim 1.

10. A non-transitory computer-readable storage medium storing a computer program that, when executed by a processor of an apparatus, causes the apparatus to perform a method for inspecting a battery tab according to claim 1.

* * * * *